United States Patent [19]

Albert et al.

[11] 4,104,920
[45] Aug. 8, 1978

[54] PIEZOELECTRIC DAMPING MECHANISM

[75] Inventors: William Charles Albert, Boonton; Robert Mark Hohenstein, Glen Ridge, both of N.J.

[73] Assignee: The Singer Company, Little Falls, N.J.

[21] Appl. No.: 783,916

[22] Filed: Apr. 1, 1977

[51] Int. Cl.² ............................................. G01P 15/10
[52] U.S. Cl. .......................... 73/517 AV; 73/DIG. 1; 73/DIG. 4
[58] Field of Search ....... 73/517 AV, 517 R, DIG. 1, 73/DIG. 4; 310/319, 328

[56] References Cited

U.S. PATENT DOCUMENTS

| 3,179,823 | 4/1965 | Nesh | 310/319 X |
|---|---|---|---|
| 3,186,237 | 6/1965 | Forrest | 73/517 R |
| 3,349,629 | 10/1967 | Elazar | 73/517 R |
| 3,453,457 | 7/1969 | Hayer et al. | 73/516 R X |
| 3,967,497 | 7/1976 | Brown | 73/DIG. 1 |

Primary Examiner—James J. Gill
Attorney, Agent, or Firm—Laurence A. Wright; Thomas W. Kennedy

[57] ABSTRACT

A damping mechanism suitable for use with a vibrating beam accelerometer comprising a piezoelectric block mounted between the vibrating beam force transducer and the pendulum of the instrument. The proof mass, or pendulum, is mounted for pendulous motion about a pair of hinge means. Vibration of the instrument causes opposite charges to appear on electrodes which are on two opposite faces of the block. These charged electrodes are connected to each other by a resistor and so a current will flow through the resistance to neutralize the charge. The resistor will then dissipate the vibration energy as heat. This energy dissipation is effectively damping.

12 Claims, 7 Drawing Figures

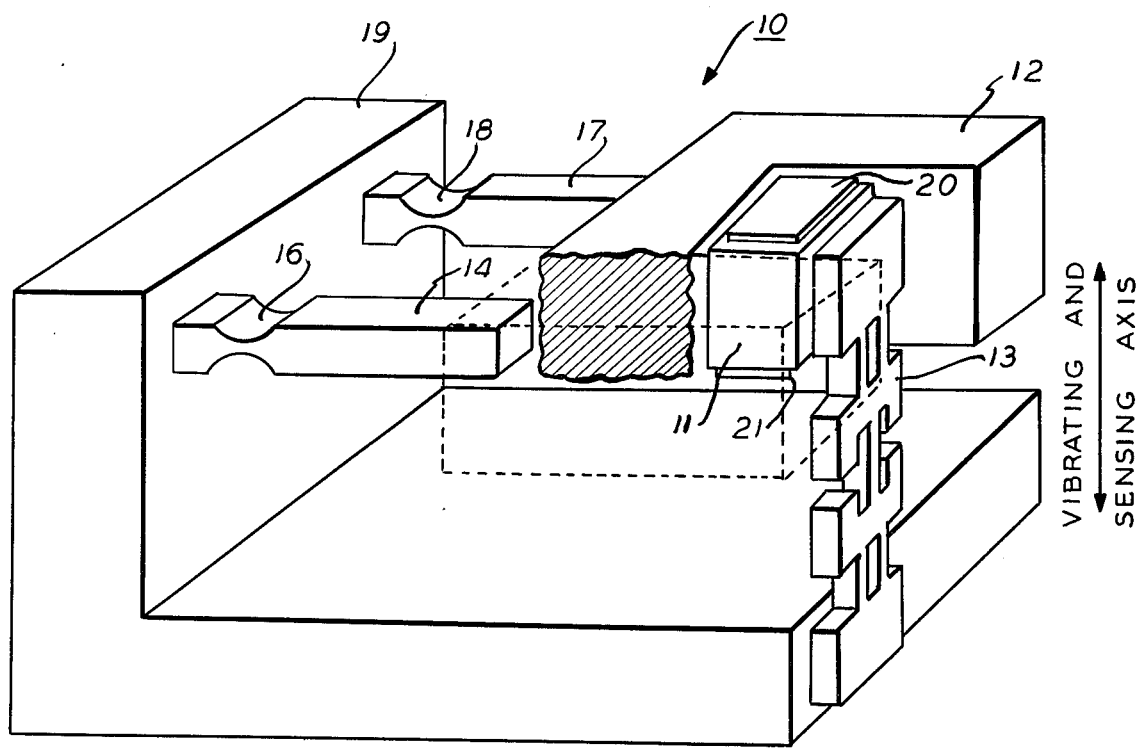
FIG. 1
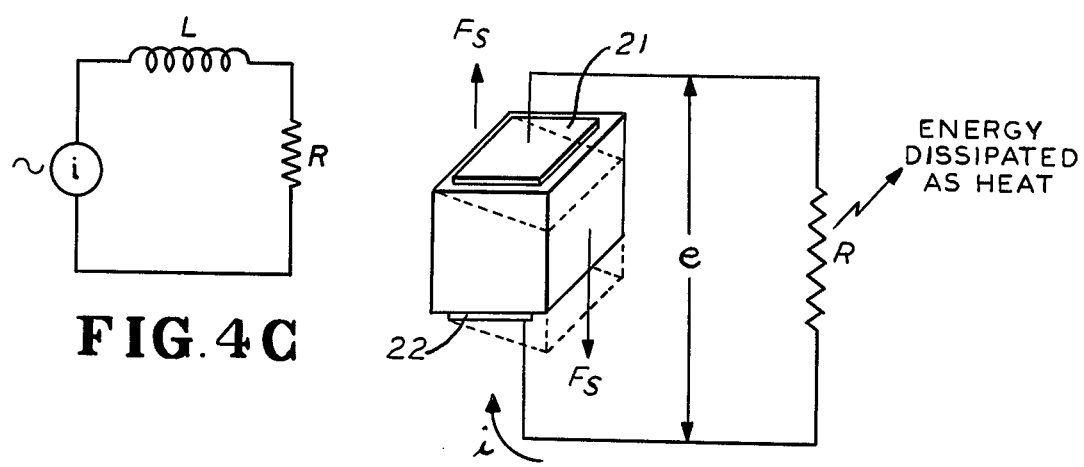
FIG. 4C
FIG. 2

PIEZOELECTRIC DAMPING MECHANISM

This invention is related to force transducers. More particularly, this invention relates to a piezoelectric damping mechanism for a vibrating beam accelerometer.

BACKGROUND OF THE INVENTION

In U.S. Pat. No. 3,470,400 to Leon Weisbord and U.S. Pat. No. 3,479,536 to Frank A Norris, both of which patents are assigned to the same assignee as the present invention, there is disclosed a vibrating beam accelerometer. As taught by these patents, the accelerometer comprises a thin elongated piezoelectric vibrating beam member mounted to receive compressive and tensile forces along its length. The forces applied to the beam affect its natural frequency of vibration. The beam is driven by electric fields acting transversely of the beam by means of longitudinally spaced electrodes along the length of the beam. The change in the natural frequency of vibration is detected by appropriate circuitry which derives information therefrom to determine the acceleration on the device.

In the vibrating beam accelerometer described by the above-mentioned patents, there is a problem of finding a means to make the device immune from external vibration. Damping in accelerometers is usually accomplished by viscous shear of a compressible fluid. Such a damping method is not possible in VBA's taught by the prior art, since the vibrating beam transducer it employs must operate in a vacuum. Eddy current damping has been attempted in some devices but has been found to be impractical because not enough relative velocity exists between the proof mass and the case during vibration.

BRIEF DESCRIPTION OF THE INVENTION

The present invention provides a damping mechanism for a vibrating beam accelerometer comprising a piezoelectric block mounted between the vibrating beam force transducer and the pendulum of the instrument. Along the longitudinal length of the block, there are positioned electrodes. The electrodes form a capacitor relative to each other. Electrically connected to the electrodes is a resistance. The block is so mounted that vibrations along the input axis cause forces which result in changes in strain. This change in strain causes an equal and opposite charge to appear on each electrode due to piezoelectric action. This charge causes a current flow in the resistance which dissipates energy not allowing it to be returned to the circuit. Thus, damping of unwanted vibrations is achieved.

Accordingly, it is an object of this invention to provide a damping mechanism capable of operating in a vacuum in a vibrating beam accelerometer.

This and other objects, features and advantages of the present invention will become apparent from the following description taken in conjunction with the accompanying drawings wherein:

FIG. 1 is a perspective view in partial cut-away of the damping mechanism of the invention;

FIG. 2 is a schematic perspective view of the piezoelectric material positioned between electrodes which are in turn positioned in a circuit with a resistor;

FIG. 4C shows another circuit for dissipating the energy generated in the piezoelectric block.

Figure 3A:
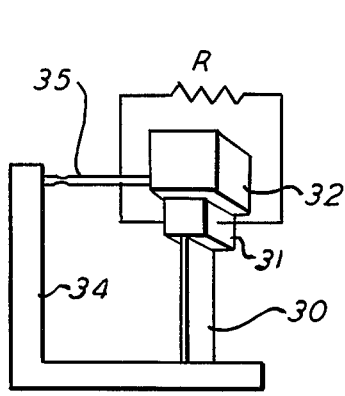
FIG. 3A shows an alternate method of loading the piezoelectric block in tension/compression.

Referring to FIG. 1, there is shown in a perspective view a vibrating beam accelerometer 10 employing the piezoelectric damping mechanism of the invention. The damping mechanism consists basically of a block of piezoelectric material 11 mounted between the proof mass 12 and the vibrating beam force transducer 13. The proof mass 12 is secured to frame 19 by hinge members 14 and 17. Each of the hinge members have necked down or reduced portions 16 and 18 respectively which serve to facilitate a swinging or pendulous movement of proof mass 12 in a vertical direction as shown by the drawing. The pendulous motion of the proof mass is restrained by both the vibrating beam transducer 13 and the damping block 11. The vibrating beam 13 is secured to frame 19. The axial direction of the vibrating beam 13 is also vertical which is thus the direction of the sensing axis of the accelerometer. All of the structure recited, it is understood, is enclosed in a casing in which there is a vacuum.

Turning to FIG. 2, vibration of vibrating beam 13 will place shear forces on block 11. Because of the particular "cut" of the block, these shear forces, by classical piezoelectric action, will cause opposite electrical charges to appear on electrodes 21 and 22. The opposing electrodes now behave as a charged capacitor and therefore, an electrical potential $e$ is present whose amplitude is proportional to the shear force, $F_s$. In parallel with the charged capacitor is placed a resistor R and, therefore, a current $i$ flow through resistor R. Since resistor R is mounted exteriorly of the housing this current flow will dissipate energy exteriorly of the housing in the form of heat in accordance with the relationship $P = I^2R$, where $P$ is power in watts (energy loss/sec.). This energy loss in the form of heat must be supplied by the vibrating system consisting of proof mass 12 and vibrating beam 13. Energy leaving this system is equivalent to viscous damping. The net effect is to reduce the mechanical transmissibility of the system and, therefore, make it immune to vibration. Unlike viscous damping, this method of damping has the advantage of being able to operate in a high vacuum which is necessary for vibrating beam operation.

Figure 3B:
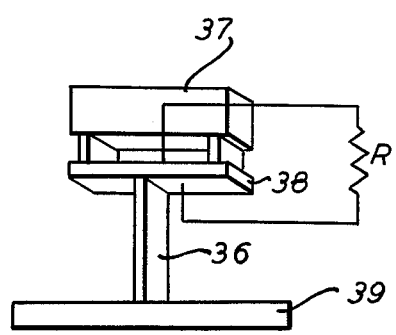
FIG. 3B shows the piezoelectric block in a bending load.

FIGS. 3A and 3B show alternate embodiments of the invention. In FIG. 3A, the block 31 is loaded in tension compression. Block 31 is positioned beween proof mass 32 and vibrating beam element 30. The vibrating beam is cantilevered mounted to frame 34. Proof mass 32 is attached to frame 34 by hinge member 35. The vibrating beam axis is shown in the vertical direction. In FIG. 3B, vibrating beam 36 is mounted on frame 39. The block 38 supports proof mass 37 and the vibrating beam axis is again in the vertical direction. In FIG. 3B, the loading on block 38 is a bending load. The cut of the piezoelectric material in any case would be such as to take advantage of the piezoelectric behavior of the material for the particular loading selected.

Figure 4A:
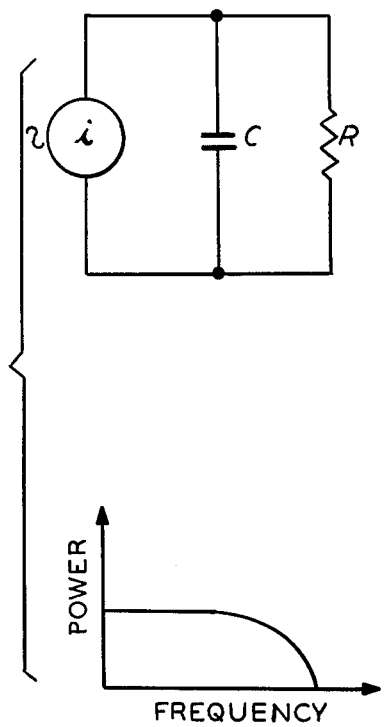
FIG. 4A shows the equivalent circuit of the block load in accordance with FIG. 3A.

In FIG. 2, the electrical load is shown as just a resistance. The equivalent circuit of this circuit is illustrated in FIG. 4A, where the charge produced by the shear force and the piezoelectric effect is illustrated as a current source, i, and the electrode capacitance by C. Such a system would have a power dissipation versus frequency curve as shown in FIG. 4A.

Figure 4B:
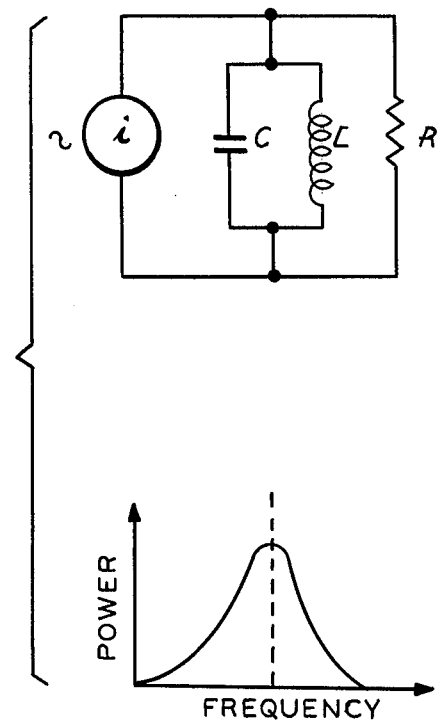
FIG. 4B shows an alternate circuit similar to FIG. 4A with an inductance placed in parallel with the capacitance and resistance.

An alternate electrical arrangement in FIG. 4B places an inductor L in parallel with the capacitance C and the resistance R. The resultant resonant frequency of the LC combination is matched to the resonant frequency of the vibrating beam-proof mass system to be damped. At resonance, the LC combination appears as an infinite impedance to current and therefore, all current flow is through the resistor R, where an irreversible power dissipation takes place. This system has an advantage over the circuit of FIG. 4A, where part of the available current flow goes into charging and discharging the capacitor where no power is dissipated. However, the system of FIG. 4B has the disadvantage of dissipating power only at or near resonance. If an impractically large inductor is needed, a circuit such as a gyrator, which behaves as an inductor, may be used. FIG. 4C shows another alternate arrangement of the invention in which the inductor L is placed in series with resistor R. In this arrangement the energy will be dissipated through the resistance in the manner of FIG. 4A.

Although the examples of the damping mechanism given above mention only piezoelectric materials, it is understood that ferroelectric materials are also usable and may have additional advantages because of the higher piezoelectric constants available. Moreover, the examples consider vibration only along the vibrating beam sensing axis, but the concept may be applied to damp vibration effects along any of the axes.

While the present invention has been described in the preferred embodiments, it will be obvious to those skilled in the art that various modifications can be made therein within the scope of the invention, and it is intended that the appended claims cover all such modifications.

What is claimed is:

1. A vibration damping device comprising:
   an evacuated housing containing said damping device,
   a support,
   a vibrating beam cantileveredly mounted on said support said beam being activated due to acceleration forces acting thereon,
   a piezoelectric block mounted at one end to the free end of said vibrating beam and at the other end to said support for generating a source of current resulting from strain forces acting upon it due to the vibration of said vibrating beam, and
   means in electrical series with said piezoelectric block for dissipating the energy released by said piezoelectric beam whereby the acceleration forces acting on said vibrating beam is effectively damped.

2. The damping device of claim 1 comprising:
   first and second electrodes mounted on opposite sides of said piezoelectric block and in electrical contact therewith, said electrodes being in capacitive relationship with each other and establishing a charge thereon resulting from the generation of electric forces in said piezoelectric block.

3. The damping device of claim 2 comprising:
   a resistor in electrical series with said electrodes whereby energy generated by said piezoelectric beam is dissipated through said resistor.

4. The damping device of claim 3 comprising:
   inductive means connected in series with said resistor and tuned for resonance with said vibrating beam whereby the energy released by said piezoelectric block is dissipated.

5. The damping device of claim 4 comprising:
   inductive means in parallel with said resistor and said electrodes and tuned for resonance with said vibrating beam whereby all of the energy released by said piezoelectric block is dissipated across said resistor due to the parallel circuit of said electrodes and inductive means effecting an infinite impedance.

6. The damping device of claim 5 comprising:
   a proof mass cantileveredly mounted about a hinge to said support said proof mass being connected to said piezoelectric block and moving in a plane orthogonal to the vibrating plane of said vibrating beam as a result of acceleration forces acting on said vibrating beam and said resistor being mounted exteriorly of said housing to dissipate the energy released from said piezoelectric block exteriorly of said housing.

7. The damping device of claim 6 comprising:
   a piezoelectric block loaded in tension compression relative to said vibrating beam.

8. The damping device of claim 6 comprising:
   a piezoelectric block loaded in a bending mode relative to said vibrating beam.

9. A vibration damping device for a vibrating beam accelerometer comprising:
   an evacuated housing containing said damping device,
   a support,
   an elongated vibrating beam cantileveredly mounted on said support said beam being forced into vibration by acceleration forces acting transversely to the long dimension of said beam,
   a proof mass cantileveredly mounted on said support and moveable in a plane orthogonal to the plane of said forces acting on said vibrating beam,
   a piezoelectric block mounted to the free ends of said proof mass and said vibrating beam said piezoelectric block being loaded in tension compression relative to said vibrating beam and generating an electric current resulting from strain forces acting upon it due to the motion of said vibrating beam,
   first and second electrodes mounted on opposite sides of said piezoelectric block and in electrical circuit with said piezoelectric block, and
   a resistor mounted exteriorly of said housing and in electrical series with said electrodes whereby the electric current generated by said piezoelectric block is dissipated through said resistor dampening the vibrations of said vibrating beam.

10. The damping device of claim 9 comprising:
    inductive means connected in electrical series with said resistor and tuned for resonance with said vibrating beam.

11. The damping device of claim 9 comprising:
    inductive means in a parallel electrical circuit with said resistor and said electrodes said parallel circuit being tuned for resonance with said vibrating beam whereby the electrical energy generated by said piezoelectric block is dissipated across said resistor due to the parallel circuit of said electrodes and inductive means effecting an infinite impedance to said electrical energy.

12. A vibration damping device comprising:

an evacuated housing containing said damping device, a support, a vibrating beam cantileveredly mounted on said support said beam being activated due to acceleration forces acting thereon, a proof mass cantileveredly mounted to said support and moveable in a plane orthogonal to said vibrating beam, a piezoelectric block mounted to the free ends of said proof mass and said vibrating beam for generating a source of current resulting from strain forces acting upon at due to the vibration of said vibrating beam, and means in electrical series with said piezoelectric block for dissipating energy released by said piezoelectric beam whereby the acceleration forces acting on said vibrating beam is effectively damped.

* * * * *